US012649344B2

(12) United States Patent
Ali et al.

(10) Patent No.: US 12,649,344 B2
(45) Date of Patent: Jun. 9, 2026

(54) CAMBER MODIFICATION FOR DIFFERENT DRIVING SURFACES

(71) Applicant: JAGUAR LAND ROVER LIMITED, Warwickshire (GB)

(72) Inventors: Syed Asad Ali, Whitley (GB); Luke Birch, Whitley (GB); Dennis Lausecker, Whitley (GB); Sam Brown, Whitley (GB); Anesh Mistry, Whitley (GB); William Burdock, Whitley (GB); James Kelly, Whitley (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 119 days.

(21) Appl. No.: 18/254,400

(22) PCT Filed: Nov. 26, 2021

(86) PCT No.: PCT/EP2021/083091
§ 371 (c)(1),
(2) Date: May 25, 2023

(87) PCT Pub. No.: WO2022/112468
PCT Pub. Date: Jun. 2, 2022

(65) Prior Publication Data
US 2024/0001728 A1        Jan. 4, 2024

(30) Foreign Application Priority Data

Nov. 27, 2020     (GB) ..................................... 2018693

(51) Int. Cl.
B60G 17/0165         (2006.01)
B62D 17/00           (2006.01)
(52) U.S. Cl.
CPC ......... B60G 17/0165 (2013.01); B62D 17/00 (2013.01); B60G 2200/46 (2013.01);
(Continued)

(58) Field of Classification Search
CPC ............ B60G 17/0165; B60G 2200/46; B60G 2400/822; B60G 2500/30; B60G 2600/182; B62D 17/00
(Continued)

(56) References Cited

U.S. PATENT DOCUMENTS 6,142,026 A * 11/2000 Ohashi .................. B60C 23/061
701/65
9,216,625 B2 * 12/2015 Ramirez Ruiz ........ B62D 17/00
(Continued)

FOREIGN PATENT DOCUMENTS

CN         101939179         1/2011
CN         105813903         7/2016
(Continued)

OTHER PUBLICATIONS

International Search Report and Written Opinion of the International Searching Authority for International application No. PCT/EP2021/083091 dated Mar. 21, 2022.
(Continued)

*Primary Examiner* — Logan M Kraft
*Assistant Examiner* — John D Bailey
(74) *Attorney, Agent, or Firm* — Carlson, Gaskey & Olds, P.C.

(57)        ABSTRACT

A control system (300) for controlling an actuator arrangement (104) of a vehicle (100), the actuator arrangement being capable of modifying a camber angle of at least one wheel of the vehicle, the control system comprising one or more controller (301), wherein the control system is configured to: receive (1004) surface information indicative of a low-traction surface over which the vehicle is travelling; and independence on receiving the surface information, control (1012) the actuator arrangement of the vehicle such that a wheel-to-surface contact patch of the at least one
(Continued)

wheel is laterally moved relative to the vehicle as a result of camber modification.

16 Claims, 4 Drawing Sheets

(52) U.S. Cl.
CPC .... *B60G 2400/822* (2013.01); *B60G 2500/30* (2013.01); *B60G 2600/182* (2013.01)

(58) Field of Classification Search
USPC .......................................................... 701/37
See application file for complete search history.

(56) References Cited

U.S. PATENT DOCUMENTS

| | | | | |
|---|---|---|---|---|
| 10,435,072 | B2 * | 10/2019 | Walsh | B62D 15/021 |
| 2007/0256484 | A1 * | 11/2007 | Imanishi | G01M 17/022 |
| | | | | 73/146 |
| 2010/0217491 | A1 * | 8/2010 | Naito | B60G 7/006 |
| | | | | 701/49 |
| 2010/0320706 | A1 * | 12/2010 | Horiguchi | B62D 17/00 |
| | | | | 280/5.521 |
| 2013/0190980 | A1 * | 7/2013 | Ramirez Ruiz | B60G 17/0162 |
| | | | | 701/38 |
| 2015/0149057 | A1 * | 5/2015 | Cho | B60W 30/184 |
| | | | | 701/84 |
| 2015/0174959 | A1 * | 6/2015 | Losi | B60C 11/0332 |
| | | | | 29/894.31 |
| 2018/0251156 | A1 * | 9/2018 | Sigmar | H02K 11/33 |
| 2020/0140014 | A1 * | 5/2020 | Sherin | B60G 3/00 |
| 2020/0223270 | A1 * | 7/2020 | Kunkel | B62D 17/00 |
| 2021/0291889 | A1 * | 9/2021 | Maeshiro | B62D 6/008 |

FOREIGN PATENT DOCUMENTS

| | | |
|---|---|---|
| CN | 109109601 | 1/2019 |
| JP | H05213036 A | 8/1993 |
| JP | 5056303 B2 | 10/2012 |
| JP | 2020023284 A | 2/2020 |

OTHER PUBLICATIONS

Combined Search and Examination Report under Sections 17 and 18(3) for Application No. GB2018693.8 dated Sep. 10, 2021.
Notice of First Examination Opinion for Chinese Patent Application No. 202180079203.2 mailed Jul. 22, 2025.
Second Notice of Examination for Chinese Patent Application No. 202180079203.2 mailed Mar. 19, 2026.

* cited by examiner

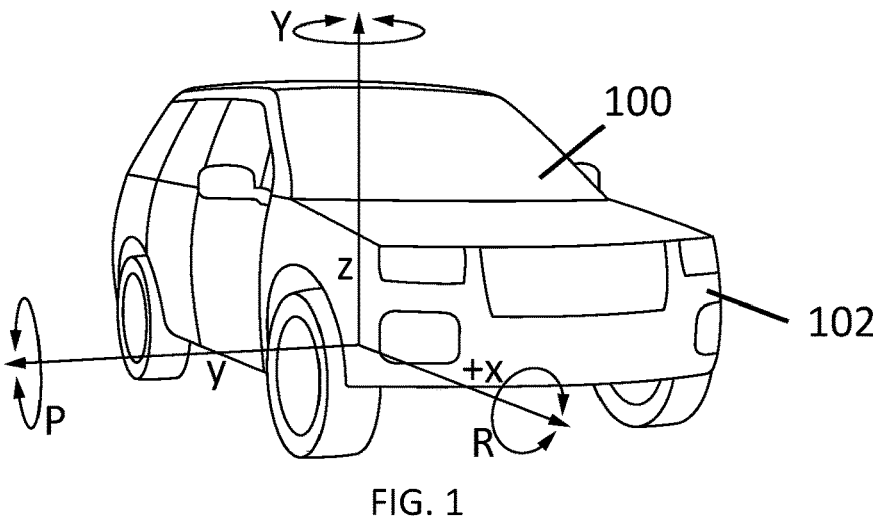
FIG. 1
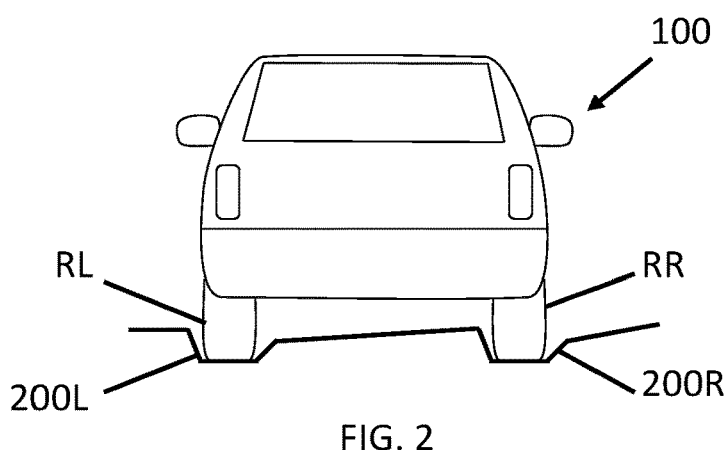
FIG. 2
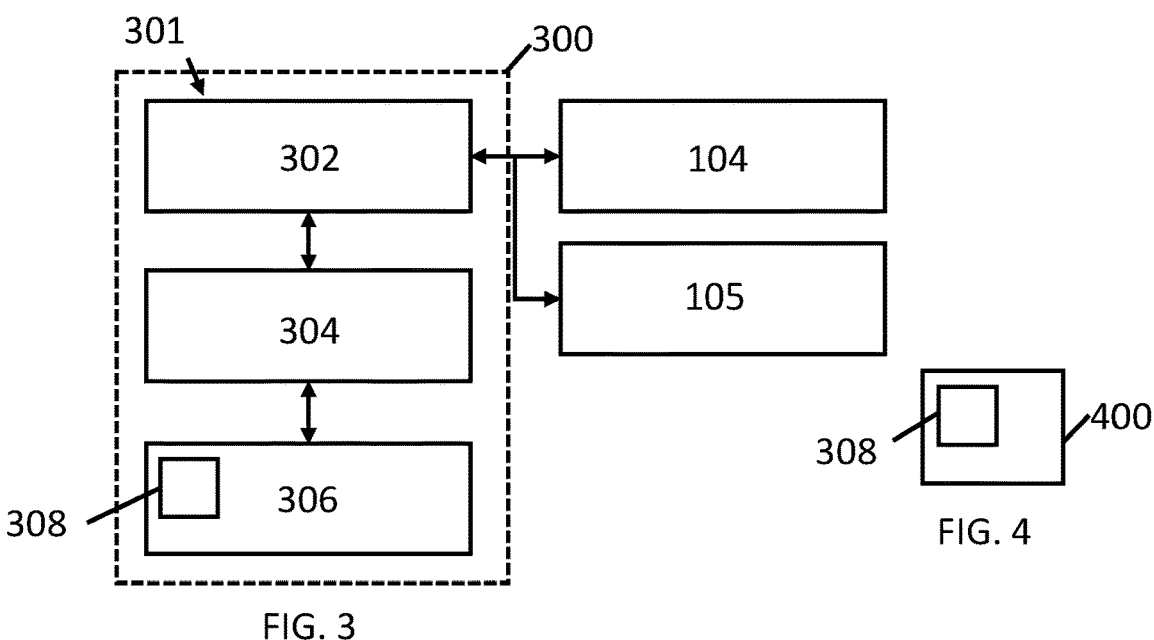
FIG. 3
FIG. 4

CAMBER MODIFICATION FOR DIFFERENT DRIVING SURFACES

TECHNICAL FIELD

The present disclosure relates to camber modification for different driving surfaces. In particular, but not exclusively it relates to camber modification of wheels of a vehicle for different off-road driving surfaces.

BACKGROUND

When driving off paved roads ('off-road'), it is possible to encounter scenarios in which the propulsive force provided through the wheel-to-surface contact patches of the driven wheels is insufficient to maintain progress.

It is an aim of the present invention to address one or more of the disadvantages associated with the prior art.

SUMMARY OF THE INVENTION

According to an aspect of the invention there is provided a control system for controlling an actuator arrangement of a vehicle, the actuator arrangement being capable of modifying a camber angle of at least one wheel of the vehicle, the control system comprising one or more controller, wherein the control system is configured to: receive surface information indicative of a low-traction surface over which the vehicle is travelling; monitor a trigger condition based on one or more criteria other than which surface is indicated by the surface information; and in dependence on the surface information indicating a low-traction surface and on satisfaction of the trigger condition, control the actuator arrangement of the vehicle such that a wheel-to-surface contact patch of the at least one wheel is laterally moved relative to the vehicle as a result of camber modification.

In some examples, monitoring the trigger condition comprises at least one of: enabling a human-machine interface, wherein the trigger condition is satisfied by detecting activation of the human-machine interface; or determining from received traction information whether traction of the vehicle is predicted or detected to fall below a traction threshold.

In some examples, monitoring the trigger condition comprises determining from traction information whether vehicle progress is below a threshold, wherein vehicle progress is indicated by vehicle speed and/or by a derivative of vehicle speed.

In some examples, the actuator arrangement comprises active camber actuators.

In some examples, the actuator arrangement comprises active suspension actuators of an active suspension system, the active suspension actuators configured to dynamically control a force-displacement relationship for individual wheels of the vehicle.

In some examples, controlling the actuator arrangement comprises controlling the active suspension system to modify camber at individual sets of one or more wheels by changing ride height at the individual sets of wheels, and wherein changing the ride height at the individual sets of wheels is dependent on at least one of: current ride height; wheel articulation; or steering angle, of the individual wheels.

In some examples, the surface information comprises one or more of: a selected terrain mode of the vehicle indicating the low-traction surface; or information obtained from one or more topography sensors indicating the low-traction surface.

In some examples, the control system is configured to enable activation of the camber modification in dependence on the surface information indicating a low-traction surface, and configured to not enable activation of the camber modification in dependence on the surface information indicating a high-traction surface.

In some examples, the camber modification comprises oscillating camber modification.

In some examples, the control system is configured to enable the oscillating camber modification when the surface information indicates a first surface, and not when the surface information indicates a second surface.

In some examples, the control system is configured to control a frequency of the oscillating camber modification in dependence on the surface information and/or in dependence on traction information indicating vehicle progress.

In some examples, the controlled frequency is less than 15 Hz.

In some examples, the control system is configured to determine a phase pattern of the oscillating camber modification in dependence on traction information, wherein determining the phase pattern comprises a determination between at least two of the following options: inducing oscillating lateral movement of a body of the vehicle; inducing oscillating yaw of the body; or symmetrical camber changes without inducing movement of the body.

In some examples, the control system is configured to determine oscillating yaw when the traction information indicates that the vehicle has traction, and to determine lateral movement or symmetrical camber changes when the traction information indicates that the vehicle lacks traction.

In some examples, the camber modification comprises steady state camber modification.

In some examples, the control system is configured to enable the steady state camber modification at least when the surface information indicates ruts, and not if the surface information does not indicate ruts.

In some examples, the control system is configured to determine whether to enable the steady state camber modification, in dependence on the surface information.

In some examples, the control system is configured to blend from the oscillating camber modification towards the steady state camber modification or towards no camber modification, in dependence on traction information indicating improving vehicle progress.

In some examples, the control system is configured to further cause oscillating steering angle changes of steerable wheels of the vehicle while the camber is modified. By oscillating the steering angle in addition to the camber modification, traction can be further improved.

According to a further aspect of the invention there is provided a control system for controlling an actuator arrangement of a vehicle, the actuator arrangement comprising a plurality of actuators individually capable of modifying a camber angle of one of a plurality of wheels of the vehicle, the control system comprising one or more controller, wherein the control system is configured to: receive surface information indicative of a low-traction surface over which the vehicle is travelling; and in dependence on the surface information indicating a low-traction surface, individually control the actuators such that wheel-to-surface contact patches of the wheels are laterally moved relative to the vehicle as a result of camber modification, wherein the camber modifications have different amplitudes and/or signs for different ones of the plurality of wheels.

According to a further aspect of the invention there is provided a control system for controlling an active camber actuator of a vehicle, the active camber actuator being capable of modifying a camber angle of at least one wheel of the vehicle, the control system comprising one or more controller, wherein the control system is configured to: receive surface information indicative of a surface over which the vehicle is travelling; and in dependence on receiving the surface information, control the active camber actuator of the vehicle such that a wheel-to-surface contact patch of the at least one wheel is laterally moved relative to the vehicle as a result of camber modification.

According to a further aspect of the invention there is provided a vehicle comprising the control system.

According to a further aspect of the invention there is provided a method of controlling an actuator arrangement of a vehicle, the actuator arrangement being capable of modifying a camber angle of at least one wheel of the vehicle, the method comprising: receiving surface information indicative of a low-traction surface over which the vehicle is travelling; and in dependence on the surface information indicating a low-traction surface, controlling the actuator arrangement of the vehicle such that a wheel-to-surface contact patch of the at least one wheel is laterally moved relative to the vehicle as a result of camber modification.

According to a further aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controller may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example vehicle and a coordinate system;

FIG. 2 illustrates a vehicle in ruts;

FIG. 3 illustrates an example control system;

FIG. 4 illustrates an example of a non-transitory computer-readable storage medium;

DETAILED DESCRIPTION

Figure 5:
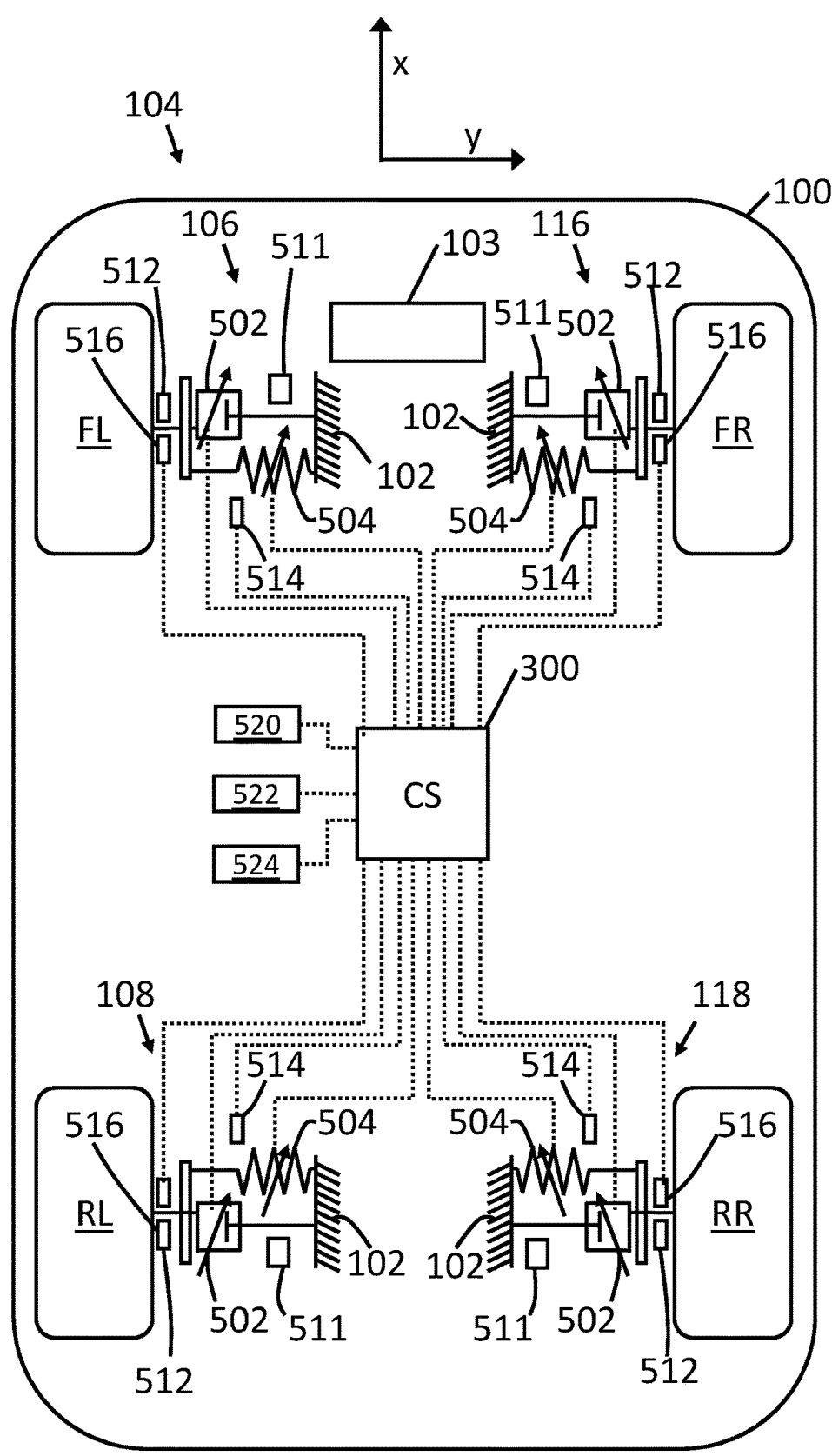
FIG. 5 illustrates an example of an active suspension system of a vehicle.

FIG. 1 illustrates an example of a vehicle 100 in which embodiments of the invention can be implemented. In some, but not necessarily all examples, the vehicle 100 is a passenger vehicle, also referred to as a passenger car or as an automobile. In other examples, embodiments of the invention can be implemented for other applications, such as industrial or commercial vehicles. The vehicle 100 has a vehicle body 102 (sprung mass) supported by a suspension.

FIG. 1 also illustrates a coordinate system. The x-axis is the longitudinal axis. A vehicle body rotation 'R' about the x-axis is roll. The y-axis is the lateral axis. A vehicle body rotation 'P' about the y-axis is pitch. The z-axis is the vertical axis. A vehicle body rotation 'Y' about the z-axis is yaw.

FIG. 2 is a rear elevation of a vehicle 100 driving on an off-road surface, in this case driving along a rutted track. Ruts are ditches in a deformable surface, cut by the repeated passage of vehicles. A left rut 200L is shown under a left rear wheel and tyre RL and a right rut 200R under a right rear wheel and tyre RR. The example ruts present a relatively low-traction surface for the vehicle wheels and tyres, either because the surface in contact with the tyres is deformable, for example being formed of soft mud or loose gravel, or because the surface is slippery, for example being covered with loose material such as stones or gravel, or because the surface has become frozen and is icy. It will be appreciated that in some areas, heavily rutted driving surfaces may be found on poorly maintained roads or tracks, but are typically more commonly found during off-road driving.

In the illustration, the centre lower portion of the tread of each tyre of each wheel contacts the lower surface of a rut. If traction is lost, it may be regained by making contact between sidewalls of the tyres and the side of the rut. This shifts the wheel-to-surface contact patch laterally towards the inside shoulder or outside shoulder of the tyre and generally enlarges the wheel-to-surface contact patch whilst the sidewall engages a wall of the rut, resulting in more traction.

Similarly, if the vehicle 100 is driving on a slippery surface such as wet grass and loses traction, some traction may be regained by laterally moving the contact patch to 'search' for regions of higher traction.

In either case, the driver can move the contact patches by manually sawing the steering wheel. However, the vehicle 100 may only have two steerable wheels. In addition, at high steering angles the wheels may become positively cambered which can increase the chance of direct contact between a rim and/or spokes of the wheel and the side of a rut. The term camber refers to the angle between the vertical axis of a wheel and the vertical axis of the vehicle 100 (z-axis). Positive camber refers to the top of the wheel being laterally farther from a longitudinal centreline of the vehicle body 102 than the bottom of the wheel. Negative camber refers to the top of the wheel being closer to the longitudinal centreline of the vehicle than the bottom of the wheel.

Examples of the present disclosure include alternative actuator arrangements that can beneficially move the contact patches to find traction.

In at least some examples there is provided an actuator arrangement capable of modifying a camber angle of at least one wheel of the vehicle 100. By modifying the camber angle, the contact patches can be moved laterally relative to the vehicle. The actuator arrangement could at least comprise one actuator per wheel or one per driven wheel, for example.

In one embodiment the actuator arrangement comprises active camber actuators 511 as shown in FIG. 5. An active camber actuator 511 can be described as a system that has the capability and authority to adjust the notional 'hard points' or pivot points of a suspension system as a function of a control demand and by using actuation energy provided from a source external to the system. An example of an active camber actuator 511 is an actuator that extends or retracts a telescopic arm (e.g. actuated screw) attached to one or both of an upper wishbone and a lower wishbone. Such actuators 511 may have a primary purpose of increasing grip during cornering, and may be controlled based on sensed lateral acceleration. However, they can be purposed to modify the camber angle in dependence on surface information according to aspects of the present disclosure.

In another embodiment the camber modification is indirect, by actively controlling vehicle ride height. This is possible because the camber of a wheel is dependent on the ride height of that wheel (wheel-to-body distance). This is due to the geometry of the vehicle suspension, wherein wheel travel (wheel-to-body displacement) is along an arc. The arc is mostly vertical and partially lateral. A higher ride height reduces negative camber or causes negative camber to become positive. A lower ride height increases negative camber.

In a further embodiment, the camber can be modified by both active camber actuators and by modifying ride height.

In at least some embodiments of the invention the vehicle ride height and therefore camber is controllable by an active suspension system of the vehicle 100. An active suspension system is a system to which energy can be supplied under the control of a control system 300 such as the one shown in FIG. 3, so as to independently vary the wheel-to-body distance at different wheels of the vehicle 100. By adding energy to the active suspension system, the ride height can increase and therefore the camber becomes positive or less negative.

Examples are provided later for improving the driving experience on low traction surfaces and rutted surfaces. An active suspension system 104 and the control system 300 will first be described.

The control system 300 of FIG. 3 comprises a controller 301. In other examples, the control system 300 may comprise a plurality of controllers on-board and/or off-board the vehicle 100. In some examples, a control system 300 or a controller 301 may be supplied as part of an active suspension system 104.

The controller 301 of FIG. 3 includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components such as the active suspension system 104 and/or an active camber actuator 105.

FIG. 4 illustrates a non-transitory computer-readable storage medium 400 comprising the instructions 308 (computer software).

FIG. 5 illustrates an example implementation of the active suspension system 104.

The active suspension system 104 comprises front left active suspension 106 for a front left wheel FL, front right active suspension 116 for a front right wheel FR, rear left active suspension 108 for a rear left wheel RL, and rear right active suspension 118 for a rear right wheel RR. The active suspension for each wheel (e.g. quarter/corner) of the vehicle 100 may be individually controllable.

FIG. 5 also shows a torque source 103 such as an internal combustion engine or electric machine, for driving at least some of the vehicle wheels such as all of the wheels FL, FR, RL, RR.

The active suspension for each corner of the vehicle 100 comprises a first actuator 502 capable of changing ride height and therefore camber.

The actuator 502 may be a hydraulic actuator such as a hydraulic fluid-filled chamber containing a piston. One end of the actuator 502 is coupled to a vehicle wheel and the other end is coupled to the vehicle body 102. A spring 504 (e.g. coil or pneumatic) may be in equilibrium and acting in parallel with the actuator 502.

When the vehicle suspension is undisturbed, the piston of the hydraulic actuator 502 sits at a particular neutral position in the chamber.

The piston can move in either direction inside the chamber, e.g. due to a road disturbance compressing the actuator 502. The piston can displace fluid out of the chamber into a hydraulic circuit (not shown). The fluid imparts a restoring force against movement of the piston. Energy can be added to and/or extracted from the actuator 502 by pumping fluid and/or controlling valves to regulate fluid pressure to either side of the piston.

Therefore, a control system 300 can dynamically control restoring force against the displaced piston. This force is equivalent to spring force of a coil spring against displacement. Dynamic control enables the force-displacement relationship to be changed to adapt to a driving scenario. Energy can be added or removed quickly, e.g. within tens of milliseconds. In order to control spring force, the control system 300 may output a force request that is dependent on sensed wheel travel (wheel-to-body displacement/articulation).

Dynamic damping characteristics of the actuator 502 can be modified by controlling a fluid valve at a constriction, which regulates the rate at which fluid is transferred in and out of the actuator 502 by movement of the piston.

Further, energy can be added to or removed from the actuator 502 to enable the wheel-to-body distance to be changed independently at different ends and/or at different sides of the vehicle 100.

The above example refers to a hydraulic actuator 502, and in other embodiments the actuator may be an electromagnetic actuator or a pneumatic actuator, or the like.

In FIG. 5 but not necessarily all examples, a second actuator capable of changing the ride height and therefore camber is the spring 504. The spring comprises an active spring such as a pneumatic spring, enabling control of ride height. The control system 300 may be configured to pump gas (e.g. air) in or out of the pneumatic spring 504 to control ride height. An air-levelling function of the control system 300 seeks to maintain a set ride height irrespective of vehicle load and achieves this by modifying the volume of air and therefore air pressure to maintain the set ride height.

Energy can be added to or removed from the active spring 504 in order to increase or decrease the volume of the active spring 504. Increasing the volume can lift the vehicle body 102 in the z-axis. In FIG. 5 this enables the wheel-to-body distance to be changed independently at different ends and/or at different sides of the vehicle 100.

Additionally or alternatively, the spring 504 comprises a passive spring (e.g. coil) or is omitted entirely.

Control of the active suspension system 104 relies on one or more sensors. Wheel travel (wheel articulation) may be sensed by a wheel-to-body displacement sensor 514 (suspension displacement-based sensor), for example. The wheel-to-body displacement sensor 514 is placed somewhere on the active suspension and can sense the position of the wheel along an arc defined by suspension geometry. An example of a wheel-to-body displacement sensor 514 is a rotary potentiometer attached to a lever, wherein one end of the lever is coupled to the vehicle body 102, and the other end is coupled to a suspension link.

In some examples, the control system 300 more accurately determines the wheel travel and/or its associated derivatives by fusing information from the wheel-to-body displacement sensor 514 with information from hub accelerometers 516.

Pressure in the pneumatic spring 504 is weight-dependent feedback that can indicate weight onto the wheel, by indicating how much pressure is required to get the vehicle body 102 up to a required ride height (depends on weight).

In at least some examples the control system 300 is configured to control the active suspension system 104 by transmitting a force request to the active suspension or to a low-level controller thereof. The force request may be an arbitrated force request based on requests from various requestors and information from various sensors.

FIG. 5 illustrates additional optional features that may interact with the control system 300 to influence force request calculation. These include any one or more of:

A wheel speed sensor 512 for each wheel. In an example implementation, the wheel speed sensor 512 is part of an antilock braking system (ABS).

A wheel hub-mounted accelerometer 516 for each wheel, coupled to the unsprung mass of the vehicle 100. A particular example is a z-axis accelerometer/IMU.

A human-machine interface (HMI) 520. This refers to any of the various input devices and input/output devices available to the driver such as touchscreens, displays, hardware switches/sliders/selectors or the like.

At least one vehicle body accelerometer 522 coupled to the vehicle body 102 (sprung mass). A particular example includes a 3DOF or 6DOF inertial measurement unit (IMU). A unit may comprise an accelerometer or a multi-axis set of accelerometers.

At least one topography sensor 524 configured to detect a surface topography around the vehicle 100. Examples include imaging sensors. Imaging sensors include visual cameras, light detection and ranging (lidar) sensors or radio detection and ranging (radar) sensors, or a combination thereof. Cameras, lidar, ultrasonic and radar sensors provide topographical information such as an image indicative of topography that can be converted to a 3D point cloud or discretized in some other way. The sensors may be located around the vehicle 100 each having different fields of view. The fields of view include a forward view in the +x-axis. If the methods herein are operable in a reverse gear, the fields of view may include a rear view in the −x-axis.

In an implementation, the active suspension system 104 is configured to vary ride height by a range, the range having a value of hundreds of millimetres (e.g. between 100-250 mm). The total camber adjustability of the front wheels is a range having a value of ±2 degrees relative to a normal/neutral camber for a default ride height.

In an implementation, the target ride height for normal on-road driving is taken as 0 mm. This corresponds to a negative front camber and a negative rear camber. A maximum target raised ride height for off-road driving is offset by a positive value of between +30 mm and +100 mm from 0 mm. This corresponds to a front camber of approximately zero, and a less negative rear camber.

The target ride height therefore depends on whether the vehicle 100 is in an on-road terrain mode or an off-road terrain mode. Terrain modes are defined at the end of the specification. The camber modification described herein is a ride height offset relative to the current target ride height. If the ride height target varies between the front and rear of the vehicle 100 (e.g. to maintain rake angle), this could be accounted for when calculating the required camber modification.

Figures 6A, 6B, 6C, 7A, 7B, 8A, 8B, 9A, 9B:
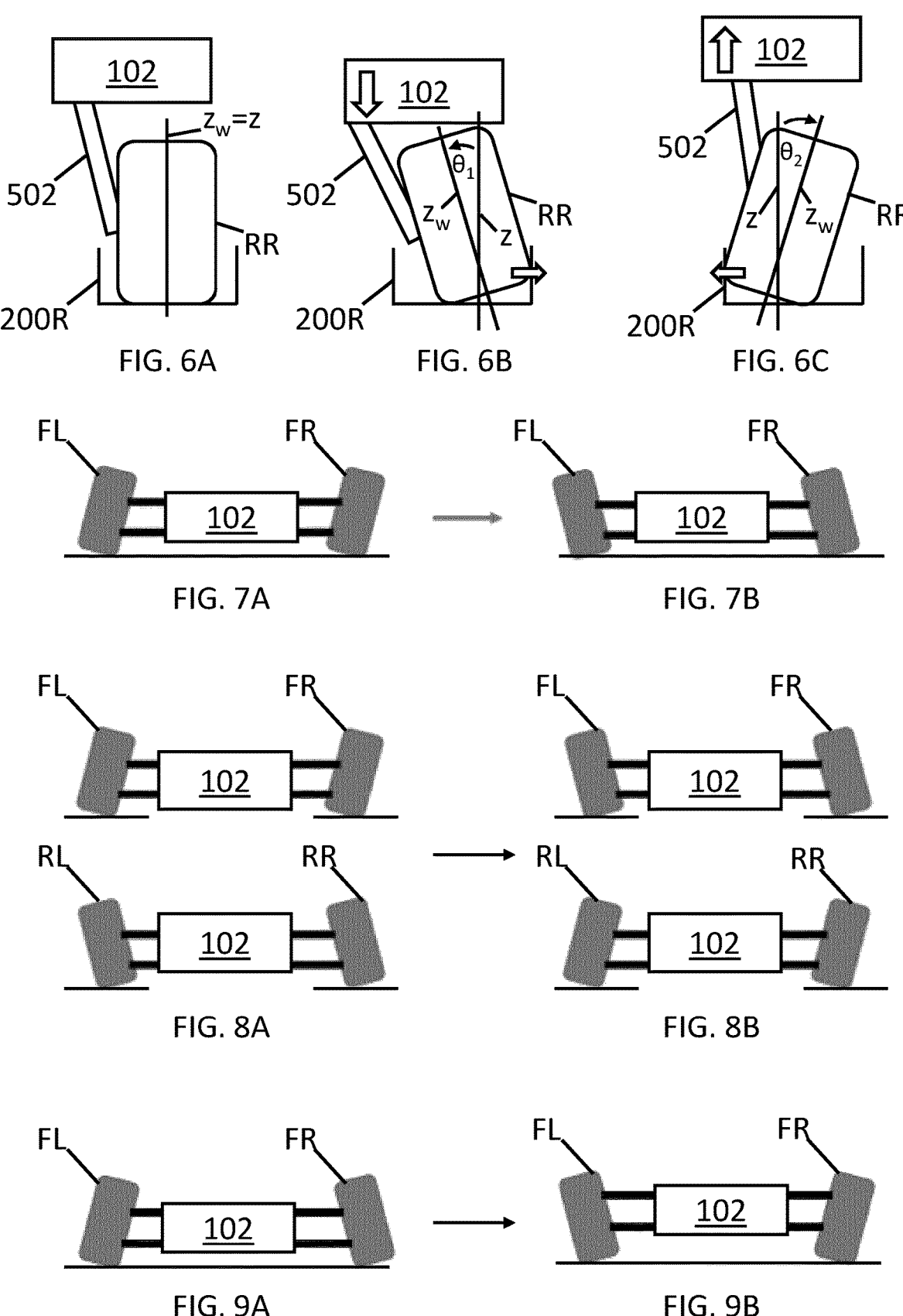
FIGS. 6A, 6B, 6C illustrate different states of camber modification.
FIGS. 7A, 7B illustrate side-to-side camber oscillation.
FIGS. 8A, 8B illustrate yawing camber oscillation.
FIGS. 9A, 9B illustrate symmetrical camber oscillation.

FIGS. 6A-6C schematically illustrates a wheel and tyre in a rut, at different cambers, to illustrate examples of the present disclosure. In this instance the wheel is a rear right wheel RR and the rut is therefore a right rut 200R, but the illustrated concept could apply to any one or more of the wheels/driven wheels. The present examples focus on ruts, although there are various other situations in which camber adjustment could be useful such as low-traction non-rutted surfaces. It may be particularly useful to employ camber adjustment when travelling along routes where the surface traction levels vary significantly along the route. In such situations, the vehicle can adjust the camber of the wheels depending on the varying traction levels so as to maximize available vehicle traction.

In FIG. 6A the wheel has zero camber so the vertical axis of the wheel $z_w$ is parallel with a vertical axis z of the vehicle 100. This corresponds to a first ride height. This is for illustrative purposes and does not necessarily correspond to normal on-road driving. For on-road driving the rear wheels may be negatively cambered. The front wheels may be negatively cambered for at least some ride heights. The rear wheels may be more negatively cambered than the front wheels. A particularly high ride height may cause the front wheels at their new camber to have zero camber or become positively cambered while the rear wheels at their new camber are still negatively cambered.

In FIG. 6B the ride height has been lowered relative to FIG. 6A by the active suspension system 104 to change camber in a negative camber direction. The wheel-to-body distance is reduced in this configuration. The resultant angular displacement of the wheel is exaggerated in FIG. 6B for illustrative purposes.

The vertical axis of the wheel $z_w$ is now angularly offset from a vertical axis z from the ground by a negative camber offset $\theta_1$. As a consequence, the outside shoulder of the tyre adjacent the contact patch of the wheel is pushed laterally away from the centreline of the vehicle 100. If the tyre is close enough to the outside wall of the rut, the tread on the outside shoulder of the tyre will make contact with the outside wall of the rut. This can help with continuously gripping ruts and maintaining traction due to the increased resultant wheel-to-surface contact patch, especially if the wheels comprise off-road tyres with shoulder tread extending one a portion of the sidewall.

Another advantage of the configuration shown in FIG. 6B is that the rim and spokes of the wheel are tilted up and away from the rut, protecting them from the rut sidewall.

In at least some examples the actuator 502 performs the camber modification. The actuator 502 is preferred to the active spring 504 when a faster camber modification is needed, at the cost of requiring more energy input. The active spring 504 is useful for slower or steady state camber modification, substantially not requiring continuous energy input to maintain a given ride height.

In FIG. 6C the ride height has been raised relative to FIG. 6A by the active suspension system 104, to change camber in a positive camber direction. The wheel-to-body distance is increased in this configuration. The vertical axis of the wheel $z_w$ is now angularly offset to the opposite side of the vertical axis z from the ground compared to FIG. 6B, by a positive camber offset $\theta_2$. As a consequence, the inside shoulder of the tyre of the wheel adjacent the contact patch is moved laterally towards the centreline of the vehicle 100. If the tyre is close enough to the inside wall of the rut, the tread on the inside shoulder of the tyre will make contact with the inside wall of the rut. This can help with continuously gripping ruts and maintaining traction in a similar manner to FIG. 6B.

In some use cases the camber can be modified in a steady state manner. In other use cases the camber can be modified in an oscillating manner, for example oscillating between different negative cambers or even oscillating between negative and positive camber. The oscillation could be a sinusoidal oscillation, for example.

The above examples are based on ride height adjustment, however, in another embodiment an active camber actuator 105 is used without an effective change of ride height.

In at least some examples the control system 300 receives surface information that influences a camber modification process, wherein the surface information is indicative of a surface over which the vehicle 100 is travelling.

Surface information can come in various forms, for example one or more of:

A selected terrain mode of the vehicle 100. Terrain modes are defined towards the end of the description.

Information obtained from one or more sensors such as topography sensors 524. Image processing of their topographical information can reveal different surfaces. A rutted surface can be determined by detecting the ruts themselves which are three-dimensional surface features. The existence of ruts is an indicator of a low-traction surface, because ruts are formed by deformation of the surface by vehicles. In some examples, topography sensors 524 can detect other surfaces such as at least one of: asphalt, snow, ice, sand, gravel, or grass.

Traction information. Traction information may comprise detected wheel slip (e.g. individual wheel velocities that differs from the average wheel velocities). Traction information could be compared with other information such as torque information indicative of torque requested/provided by the torque source 103. If wheel slip is greater than a threshold while the torque information is less than a threshold, an inference can be made that the vehicle 100 is on a low-traction surface. Rising vehicle speed and/or acceleration can also be a form of traction information indicating improving traction/progress. It will be appreciated that some environmental factors may adversely affect traction levels.

Vehicles fitted with rain sensors may detect that it is raining and those fitted with ambient temperature sensors may detect that the ambient temperature is below freezing (0° C.). The ability to determine that the surface over which the vehicle 100 is travelling is wet and/or icy may advantageously be used to determine or predict surface information.

An example method for the detection of ruts is described. A three-dimensional point cloud from a three-dimensional imaging system (e.g. cameras, radar, lidar) can be converted to a multilevel surface map. A classification algorithm distinguishes traversable terrain from non-traversable obstacles. Within the traversable terrain data, elongate curves are identified based on the characteristic of having a channel between two approximately vertical offsets (edges), wherein the dimensions of the elongate curve (vertical height, width) are within thresholds. Rut identification may further require the identification of a pair of elongate curves that are substantially parallel to each other, and may further require nominal depths and/or widths to meet a similarity condition.

Examples are provided below of how surface information could influence the camber modification.

Examples are first provided below in which surface information is used when deciding whether to enable (allow) activation of the camber modification feature.

In some, but not necessarily all examples, the control system 300 is configured to enable activation of the camber modification in dependence on the surface information indicating a first surface such as a low-traction surface, and configured to not enable activation of the camber modification in dependence on the surface information indicating a second surface such as a high-traction surface. Surface information indicating a high-traction surface can comprise, for example, a currently selected terrain mode being a 'normal mode'. Surface information indicating a low-traction surface can comprise, for example, the currently selected terrain mode being a different terrain mode. Terrain modes are described later.

Enabling activation may comprise monitoring a trigger condition for automatic camber modification (activation without user intervention), or for manual triggering of camber modification.

Monitoring a trigger condition for manual triggering of camber modification may comprise enabling an HMI 520 that would otherwise not be available to the driver. The trigger condition is satisfied by activation of the HMI 520.

Monitoring a trigger condition for automatic triggering of camber modification may comprise determining whether traction is predicted or detected to fall below a traction threshold for example, as indicated by traction information. The value of the traction threshold may be calibrated to avoid false positives, and/or may be determined using one or more cost functions, such as a comfort cost function and/or an energy cost function.

In some examples the trigger condition can require traction information to be below a threshold (e.g. vehicle speed below threshold, wheel speeds excessive compared to vehicle speed, vehicle acceleration less than expected). A speed threshold could have a value less than 20 metres per second.

In both of the above examples, being on a particular type of surface is necessary but not sufficient for triggering camber modification, and further criteria must be satisfied (e.g. manual or automatic trigger, and optionally the vehicle speed must also be low).

Helping a driver to decide when/how to manually trigger camber modification could be aided by display of image data from a camera 524 facing towards the path of intended travel of the vehicle 100 (forward/rearward), especially if the camera is mounted such that it enables terrain otherwise obstructed from the driver's view by the vehicle bonnet (hood) to be seen.

Now, examples are described in which surface information influences one or more determined characteristics of the camber modification, once it is established that camber modification will be triggered. Calculation of the camber modification may be expressed as a camber target, that may be converted to a wheel-to-body displacement target depending on the type of actuator.

Examples of characteristics to be determined include one or more of: which way the camber should be changed; how far the camber should be changed; which wheels the camber should be changed for; when to perform a steady-state (unchanging) adjustment; when to oscillate the camber adjustment; the appropriate frequency to use for an oscillating camber modification; or when a pattern of camber modification/oscillation should be applied.

In an example the control system 300 is configured to enable steady state (non-oscillating, constant) camber modification in dependence on the surface information. Steady-state camber modification can be available in dependence on the surface information indicating ruts. In a more specific example, steady-state camber modification is available when the vehicle 100 is progressing as desired in ruts and is not stuck. This is because the traction provided by the current tyre-to-rut contact is sufficient to maintain progress.

In some examples, the direction (FIG. 6B or 6C) of steady state camber modification for ruts depends on surface information. The direction may depend on which one of a positive or negative camber modification can cause contact between a tyre sidewall (e.g. shoulder) and a detected sidewall of a rut. The lateral position of the wheel within the rut may be known from sensor feedback such as steering torque, data from topography sensors 524 etc. If the distance between the inside shoulder of a tyre and the inside sidewall of a rut is greater than the distance between the outside shoulder of the tyre and the outside sidewall of the rut, a positive camber modification as shown in FIG. 6C may be appropriate. If the opposite is true, a negative camber modification as shown in FIG. 6B may be appropriate.

If the camber modification comprises an oscillating camber modification rather than a steady-state camber modification, the frequency can be controllable within a bandwidth of the actuators (e.g. 0-12 Hz or more), based on information including surface information. In an example, a higher frequency is available when the surface indicates ruts than when the surface information indicates a non-rutted low-traction surface (e.g. grass, ice, sand). A higher frequency is suitable for ruts, by making use of the tyre dynamics to clamp/deform the rut wall. A lower frequency is suitable for grass and sand (and sometimes snowy/icy surfaces), because it is desired not to disturb the fine layer of top material that provides better traction than the underlying material.

In some examples, the control system 300 limits the allowable range of ride height adjustment for camber adjustment in dependence on surface information, to prevent the vehicle 100 from bottoming/bellying out.

Topography sensor information provides a suitable indication of a minimum acceptable ride height for preventing bellying out (with a margin of safety added).

Some characteristics of the camber modification could be controlled based on information other than surface information. Examples are provided below.

In some examples, the direction of steady state camber modification for ruts depends on driver action. The control system 300 can determine whether to apply a negative camber modification (FIG. 6B) or a positive camber modification (FIG. 6C) in dependence on the driver action. The driver action may comprise a measured steering angle. The driver can therefore steer to indicate which side to 'lean' towards.

Given that steering already has a relationship with camber, the calculated camber adjustment of a set of steerable wheels (e.g. FL, FR) could be a calculated offset from that known relationship. The camber adjustment could either counteract or exaggerate the camber changes caused by changes of steering angle. In other words, the camber modifications have different magnitudes for different ones of a plurality of steerable wheels.

In some examples, the camber modifications of each individual wheel may be controlled in dependence on a wheel articulation (wheel-to-body distance) of that wheel. If some wheels are closer to the vehicle body 102 than others due to uneven terrain, some wheels may require more or less individual corner ride height adjustment than others, to achieve the required camber target modification. In other words, the camber modifications have different magnitudes for different ones of the plurality of wheels.

In some examples, the frequency of oscillating camber modification depends on traction information.

The frequency can reduce for improving traction information. There could be two or three stages. A first stage comprises camber oscillation at a frequency that rises in proportion to falling traction as indicated by the traction information. Traction information that indicates falling traction can include any one or more of vehicle speed, wheel speed mismatch, excessive wheel speed relative to vehicle speed, insufficient vehicle acceleration, etc. A final stage comprises deactivation of camber modification when the indicated traction rises above a peak threshold (e.g. speed threshold having a value less than 15 m/s, and/or an acceleration threshold). An optional intermediate stage comprises steady-state non-oscillating camber modification when the indicated traction is above a first threshold but below the peak threshold.

The three-stage approach can be useful for ruts because the oscillation helps to find ('discover') a camber setting that has the best traction. When the traction is improved, the vehicle speed/acceleration will tend towards that requested by the user so the control system can maintain the successful camber setting in steady state until the vehicle either has enough momentum or traction is lost again. If traction is lost again, the oscillation may return with a frequency proportional to falling vehicle progress (e.g. blend function).

The two-stage approach can be appropriate for grass, sand and icy/snowy surfaces because steady state camber modification is mainly intended for ruts which have sidewalls.

In some examples, the frequency depends at least in part on tyre stiffness. Tyre stiffness can be inferred by measurement of tyre pressure using a tyre pressure monitoring system (TPMS), or manually indicated via HMI input. A higher frequency can be appropriate for a higher tyre pressure. In some examples, the amplitude of camber modification (e.g. maximum lateral force) can be limited in dependence on an indication of low tyre stiffness (e.g. pressure below a threshold), to prevent de-beading. If tyre stiffness (e.g. pressure) is high (e.g. above an upper threshold), the amplitude can also be limited, to reduce the probability of a puncture.

Although all of the above examples rely on feedback to determine one or more characteristics of camber adjustment, it would be appreciated that in other implementations one or more characteristics could be open loop, resulting in a predetermined behaviour.

Now phase patterns will be described. FIGS. 7A-9B are schematic end views of a vehicle 100, illustrating examples of phase patterns of oscillating camber modification. Three examples are shown:

FIGS. 7A-7B, oscillating lateral (side-to-side) movement of the vehicle body 102;

FIGS. 8A-8B, oscillating yaw movement of the vehicle body 102; or

FIGS. 9A-9B, oscillating symmetrical camber changes without inducing movement of the vehicle body 102.

The illustrations show variation between positive and negative camber. In other embodiments one or more sets of wheels could vary camber while the camber always stays negative, or always stays positive.

First, oscillating lateral movement of the vehicle body 102 is described with reference to FIGS. 7A-7B. FIG. 7A represents a first time at which a front left wheel FL is negatively cambered while a front right wheel FR is positively cambered. Therefore, the vertical axes of the wheels both face a first direction relative to the vertical axis of the vehicle 100. They may be approximately parallel.

FIG. 7B represents a second time, 180 degrees of oscillation after the first time. The front left wheel FL is now positively cambered while the front right wheel FR is negatively cambered. Therefore, the vertical axes of the wheels remain approximately parallel but now face a second opposite direction relative to the vertical axis of the vehicle 100.

The cycling oscillation between FIG. 7A and FIG. 7B means that the left and right wheel cambers are oscillating in-phase. This laterally moves the wheel-to-surface contact patches in such a way that a side-to-side movement of the vehicle body 102 is induced. This is advantageous for finding traction when traction has been lost, because the weight transfer helps the tread of the tyres to bite into the surface. The frequency of oscillation could be controlled to induce a side-to-side movement matching the natural roll frequency of the vehicle (e.g. between 1 Hz and 5 Hz, such as 3 Hz). Determining that traction has been lost may comprise determining that traction is below a traction threshold, with reference to traction information described earlier.

In some examples, an electronic power-assisted steering system (EPAS) can be controlled by the control system 300 to counteract steering torque resulting from the camber oscillation. Alternatively, the steering torque is controlled so as to provide reassuring feedback if preferred.

Although FIGS. 7A-7B only show the front wheels FL, FR, the pattern could be additionally performed by the rear wheels RL, RR in phase with the front wheels. In the example of FIGS. 7A-7B the camber modifications have different signs for left and right wheels because one lateral side has a positive camber modification while the other side has a negative camber modification.

Next, oscillating yaw movement of the vehicle body 102 is described with reference to FIGS. 8A-8B. FIG. 8A represents a first time at which the front left wheel FL and rear right wheel RR are negatively cambered while the front right wheel FR and rear left wheel RL are positively cambered.

FIG. 8B represents a second time, 180 degrees of oscillation after the first time, at which the front left wheel FL and rear right wheel RR are positively cambered while the front right wheel FR and rear left wheel RL are negatively cambered. In the example of FIGS. 8A-8B the camber modifications have different signs between wheels because one wheel has a positive camber modification while another wheel has a negative camber modification. In some examples, one diagonal pair of wheels can implement a positive camber modification while the other diagonal pair of wheels can implement a negative camber modification.

In some examples, the frequency could be configured based on measured vehicle speed and wheelbase such that a front wheel camber is at a first sign when passing a point x, and the rear wheel camber is controlled to have the same sign when passing the same point x.

The cycling oscillation between FIG. 8A and FIG. 8B means that the left and right wheel cambers are oscillating in-phase but the rear wheel cambers are oscillating 180 degrees out of phase with the front wheel cambers. This laterally moves the wheel-to-surface contact patches in such a way that a controlled yawing movement of the vehicle body 102 about the z-axis is induced. This is advantageous for keeping traction when the vehicle 100 already has traction, because the rear wheels follow the front wheels to follow a known good path. Determining that the vehicle 100 already has traction may comprise determining that traction is greater than the traction threshold, with reference to traction information described earlier.

Next, oscillating symmetrical camber changes without inducing movement of the vehicle body 102 are described with reference to FIGS. 9A-9B. FIG. 9A represents a first time at which a front left wheel FL is negatively cambered while a front right wheel FR is negatively cambered. Therefore, the vertical axes of the wheels converge towards each other.

FIG. 9B represents a second time, 180 degrees of oscillation after the first time. The front left wheel FL is now positively cambered while the front right wheel FR is positively cambered. Therefore, the vertical axes of the wheels diverge away from each other.

The cycling oscillation between FIG. 9A and FIG. 9B means that the left and right wheel cambers are oscillating 180 degrees out-of-phase but this maintains symmetry. This laterally moves the wheel-to-surface contact patches in such a way that substantially no movement of the vehicle body 102 is induced, because the movements of the contact patches are cancelled out. This is advantageous for finding traction when traction has been lost, if the pattern of FIGS. 7A-7B did not work or were not desired for comfort reasons. Determining that traction has been lost may comprise determining that traction is below a traction threshold, with reference to traction information described earlier.

Although FIGS. 9A-9B only show the front wheels FL, FR, the pattern could be additionally performed by the rear wheels RL, RR in phase or 180 degrees out of phase with the front wheels.

As shown in FIGS. 9A-9B, a vehicle track width between laterally spaced wheel-to-surface contact patches is changed as a result of the camber modification. By making the track width greater than or less than the rut-to-rut spacing, the wheels can more easily maintain contact with the side walls of the ruts.

In some examples, the three patterns of FIGS. 7A-7B, 8A-8B and 9A-9B can be tried in sequence until the best traction is found (e.g. least wheel slip).

Whilst the above examples describe adjusting the camber of at least one wheel between a positive and a negative camber angle, it will be appreciated that in some circumstances, the camber angle may be varied between a substantially zero camber angle and one that is either more positive or more negative, depending on the available camber angle adjustment provided by the vehicle suspension system.

Figure 10:
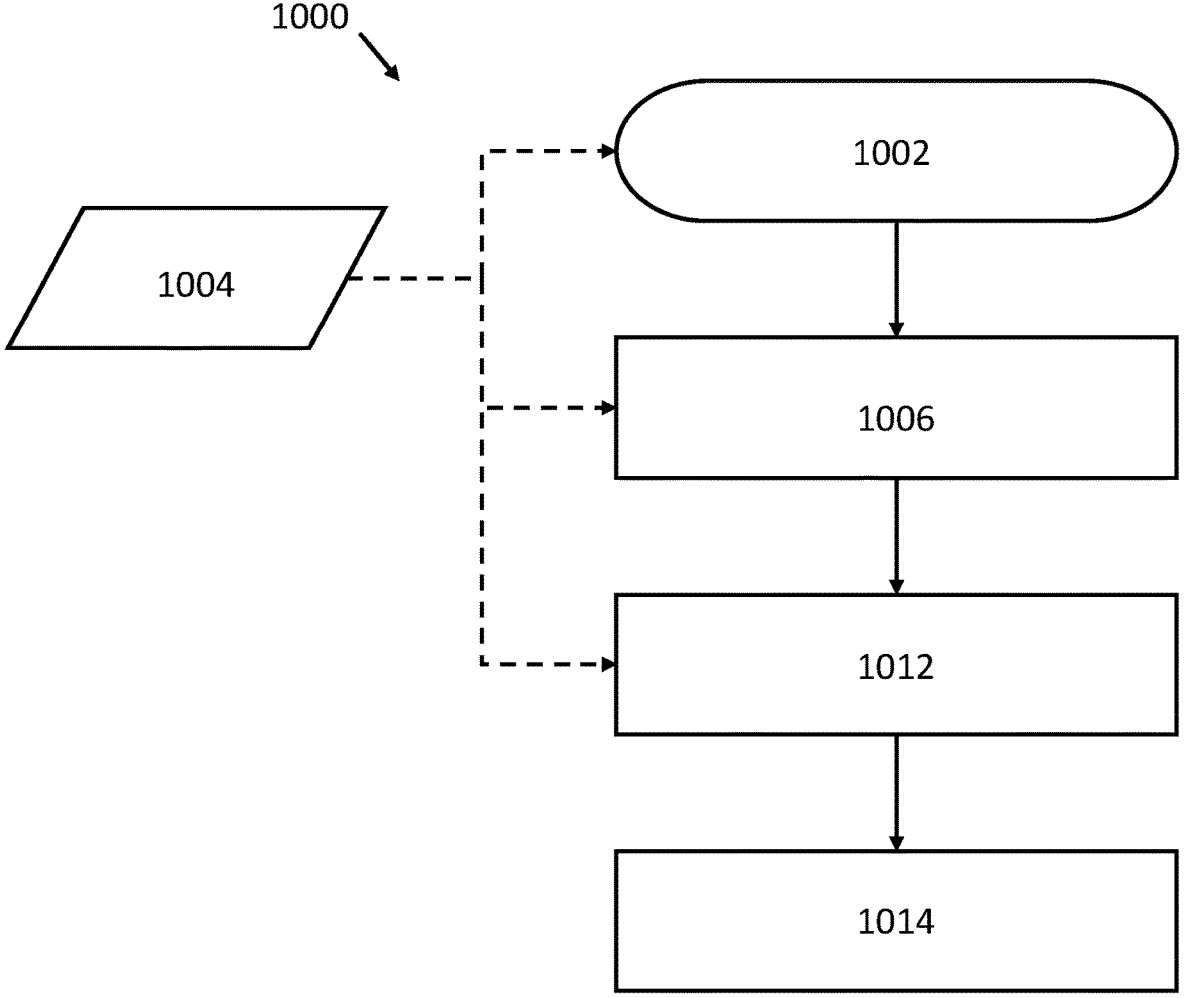
FIG. 10 illustrates an example method.

FIG. 10 illustrates an example control method 1000 for performing the camber modification. The method 1000 may be implemented by the control system 300.

The method 1000 starts at operation 1002 in which the camber modification is enabled. Examples are provided earlier, wherein optionally a low traction surface satisfies operation 1002 but is not alone sufficient for triggering camber modification. Information indicating a low traction surface comes from a surface information data block 1004.

Enabling camber modification may optionally require that one or more inhibit conditions are not active, for example dependent on one or more of:

an indication based on topography sensor information that bellying out cannot be avoided (relevant if the camber modification requires ride height changes); or rutted tracks where the rut-to-rut spacing is narrower than a threshold, as indicated by the topography sensor information.

Operation 1006 of the method 1000 is a trigger, determining that camber modification is required, based on all one or more trigger conditions being satisfied.

Examples are provided earlier, wherein either the user manually activates (triggers) camber modification, or camber modification is automatically triggered based on traction falling below a traction threshold, as indicated by traction information. The surface information data block 1004 can provide the traction information if required.

The method 1000 may then at 1012 determine one or more characteristics of the camber modification, in accordance with the examples described earlier.

In the above method 1000 each operation 1002, 1006 and 1012 is dependent on surface information. In other embodiments only some or just one of the above operations is dependent on surface information.

In operation 1014, but not necessarily all examples the control system 300 may also vary a steering angle at one or more steerable wheels, during or after the camber modification. Varying the steering angle may comprise sawing the steering angle from left to right repeatedly, to help the wheel to find traction. An EPAS has the relevant actuator to perform this operation under automatic control of the control system 300, without requiring the driver to use the steering wheel.

Another operation (not shown) that can assist with vehicle progress comprises automatically controlling torque from the torque source 103 and/or controlling braking, to provide one or more predetermined wheel rotations or a predetermined pattern of wheel rotations (e.g. backwards and forwards).

The method 1000 may continue until an exit condition is satisfied, such as manual deactivation, detection that traction is above a traction threshold, or that the vehicle speed exceeds a predetermined threshold. When the exit condition is satisfied, the camber may be changed ('reset') back to normal angles. The exit condition may also be satisfied following a cycling of the vehicle power, such as a key-off/key-on cycle.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controller may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

Terrain modes are defined. Different terrain modes control one or more vehicle subsystems according to different sets of configurations. A terrain mode generally refers to vehicle modes optimized for driving over particular driving surfaces. An example of a terrain mode is an off-road terrain mode, arranged to optimize the vehicle for driving over low-traction surfaces such as may be required when traversing areas of grass, gravel, sand, mud, ruts or even crawling over rocks. Another example of a terrain mode is a surface vehicle optimization mode, arranged to optimize the vehicle for driving over low traction surfaces such as snow or ice covered surfaces, either on or off road. A vehicle may comprise a base on-road mode ('Normal mode') and/or a base surface vehicle optimization mode for regular high-traction surfaces, and may comprise a plurality of terrain modes for various surfaces and/or terrain, such as 'Grass/Gravel/Snow', 'Mud', 'Sand', and 'Rock Crawl' modes.

A terrain mode and/or detection of a particular terrain type may configure one or more surface traction-related configurations such as a differential locking setting and/or a traction control setting. Additionally, or alternatively, other configurations could be adjusted such as: a suspension setting; a ride height setting; a suspension damper setting; a throttle response setting; a gear shift point setting; a vehicle braking or traction control setting; a torque distribution setting; a torque shaping setting; or a steering weighting setting. The configurations may be predetermined or reconfigurable.

A manual user selection may comprise use of a human-machine interface input device. The input device may comprise an engine start button. The input device may comprise a terrain mode selector. In some examples, a terrain mode may be changeable automatically.

The blocks illustrated in FIG. 10 may represent steps in a method and/or sections of code in the computer program 308. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system comprising one or more processors configured to:

receive surface information indicative of a low-traction surface over which the vehicle is travelling;

monitor a trigger condition based on at least one criterion other than which surface is indicated by the surface information;

in dependence on the surface information indicating a low-traction surface and on satisfaction of the trigger condition, control an actuator arrangement of the vehicle by controlling active suspension actuators of an active suspension system to dynamically control a force-displacement relationship for individual wheels of the vehicle to modify a camber angle of at least one wheel of the vehicle such that a wheel-to-surface contact patch of the at least one wheel is laterally moved relative to the vehicle as a result of camber modification, the camber modification comprises oscillating camber modification, the active suspension actuators configured to independently vary a wheel-to-body distance at each of the wheels of the vehicle;

enable activation of the camber modification in dependence on the surface information indicating the low-traction surface;

not enable activation of the camber modification in dependence on the surface information indicating a high-traction surface; and control a frequency of the oscillating camber modification in dependence on at least one of the surface information and traction information indicating vehicle progress.

2. The control system of claim 1, configured to determine a phase pattern of the oscillating camber modification in dependence on traction information; and determine the phase pattern based on a determination between at least two of the following options: inducing oscillating lateral movement of a body of the vehicle; inducing oscillating yaw of the body; and symmetrical camber changes without inducing movement of the body.

3. The control system of claim 2, configured to determine oscillating yaw when the traction information indicates that the vehicle has traction, and determine lateral movement or symmetrical camber changes when the traction information indicates that the vehicle lacks traction.

4. The control system of claim 1, wherein the camber modification comprises steady state camber modification.

5. The control system of claim 4, configured to enable the steady state camber modification at least when the surface information indicates ruts, and not enable the steady state camber modification if the surface information does not indicate ruts.

6. The control system of claim 1, wherein the control system is configured to monitor the trigger condition by at least one of:

enabling a human-machine interface, wherein the trigger condition is satisfied by detecting activation of the human-machine interface; and determining from received traction information whether traction of the vehicle is predicted or detected to fall below a traction threshold.

7. The control system of claim 1, wherein the control system is configured to monitor the trigger condition by determining from traction information whether vehicle progress is below a threshold, wherein vehicle progress is indicated by at least one of vehicle speed and a derivative of vehicle speed.

8. The control system of claim 1, wherein the actuator arrangement comprises active camber actuators.

9. The control system of claim 1, wherein the actuator arrangement comprises active suspension actuators of an active suspension system, and the active suspension actuators are configured to dynamically control a force-displacement relationship for individual wheels of the vehicle.

10. The control system of claim 1, wherein the surface information comprises at least one of:

a selected terrain mode of the vehicle indicating the low-traction surface; and information obtained from at least one topography sensor indicating the low-traction surface.

11. The control system of claim 1, configured to enable the oscillating camber modification when the surface information indicates a first surface, and not when the surface information indicates a second surface.

12. The control system of claim 1, configured to cause oscillating steering angle changes of steerable wheels of the vehicle while the camber is modified.

13. A vehicle comprising the control system of claim 1.

14. A control system configured to:

receive surface information indicative of a surface over which a vehicle is travelling;

in dependence on the surface information indicating a low-traction surface, control an actuator arrangement by controlling active suspension actuators of an active suspension system to dynamically control a force-displacement relationship for individual wheels of the vehicle to modify a camber angle of at least one wheel of the vehicle such that wheel-to-surface contact patches of the wheels are laterally moved relative to the vehicle as a result of camber modification, wherein the camber modifications comprise oscillating camber modifications that are different in at least one of amplitude and sign for different ones of the plurality of wheels, the active suspension actuators configured to independently vary a wheel-to-body distance at each of the wheels of the vehicle;

enable activation of the camber modification in dependence on the surface information indicating the low-traction surface;

not enable activation of the camber modification in dependence on the surface information indicating a high-traction surface; and control a frequency of the oscillating camber modification in dependence on at least one of the surface information and traction information indicating vehicle progress.

15. A method of controlling an actuator arrangement of a vehicle, the actuator arrangement being capable of modifying a camber angle of at least one wheel of the vehicle, the method comprising:

receiving surface information indicative of a surface over which the vehicle is travelling;

monitoring a trigger condition based on one or more criteria other than which surface is indicated by the surface information;

in dependence on the surface information indicating a low-traction surface and on satisfaction of the trigger condition, controlling an actuator arrangement of the vehicle by controlling active suspension actuators of an active suspension system to dynamically control a force-displacement relationship for individual wheels of the vehicle to modify a camber angle of at least one wheel of the vehicle such that a wheel-to-surface contact patch of the at least one wheel is laterally moved relative to the vehicle as a result of camber modification, the camber modification comprises oscillating camber modification, the active suspension actuators configured to independently vary a wheel-to-body distance at each of the wheels of the vehicle;

enabling activation of the camber modification in dependence on the surface information indicating the low-traction surface;

not enabling activation of the camber modification in dependence on the surface information indicating a high-traction surface; and controlling a frequency of the oscillating camber modification in dependence on at least one of the surface information and traction information indicating vehicle progress.

16. A non-transitory storage medium containing instructions that, when executed by at least one processor, cause the processor to perform the method of claim 15.

* * * * *